United States Patent [19]

Vassar

[11] 4,248,445
[45] Feb. 3, 1981

[54] CASTER BRAKE AND SWIVEL LOCK

[76] Inventor: Hervey P. Vassar, Nicol Ter., Rumson, N.J. 07760

[21] Appl. No.: 49,214

[22] Filed: Jun. 18, 1979

[51] Int. Cl.³ .............................................. B60B 33/02
[52] U.S. Cl. .............................. 280/79.1 R; 16/35 R; 188/1 D
[58] Field of Search ............. 280/33.99 C, 11.2, 79.1; 188/1 D, 29, 166, 167; 16/35 R, 35 D, 18 R; 292/38

[56] References Cited

U.S. PATENT DOCUMENTS

| | | | |
|---|---|---|---|
| 1,671,774 | 5/1928 | McIntosh | 188/1 D |
| 2,415,612 | 2/1947 | Straessli | 292/38 |
| 2,572,548 | 10/1951 | Weisz et al. | 188/1 D |
| 3,563,563 | 2/1971 | Radovic | 280/79.1 R |
| 4,035,864 | 7/1977 | Schroder | 16/35 R |
| 4,114,232 | 9/1978 | Umeda | 188/1 D X |
| 4,128,144 | 12/1978 | Vassar | 188/29 X |

FOREIGN PATENT DOCUMENTS 129651  9/1901  Fed. Rep. of Germany .......... 188/166

Primary Examiner—John J. Love
Assistant Examiner—Donald W. Underwood
Attorney, Agent, or Firm—Richard L. Miller

[57] ABSTRACT

A dolly, including a platform supported upon several caster wheels, and a single control knob on the dolly, when released, brakes all the wheels simultaneously and at a same time locks all caster wheels from swiveling; each caster wheel including a mechanism which when released, wedges a pair of rollers from opposite directions against the wheel rim, and at the same time jambs an eccentrically carried post on the wheel bracket against a resilient rubber or plastic pad stationarily mounted under the platform.

1 Claim, 7 Drawing Figures

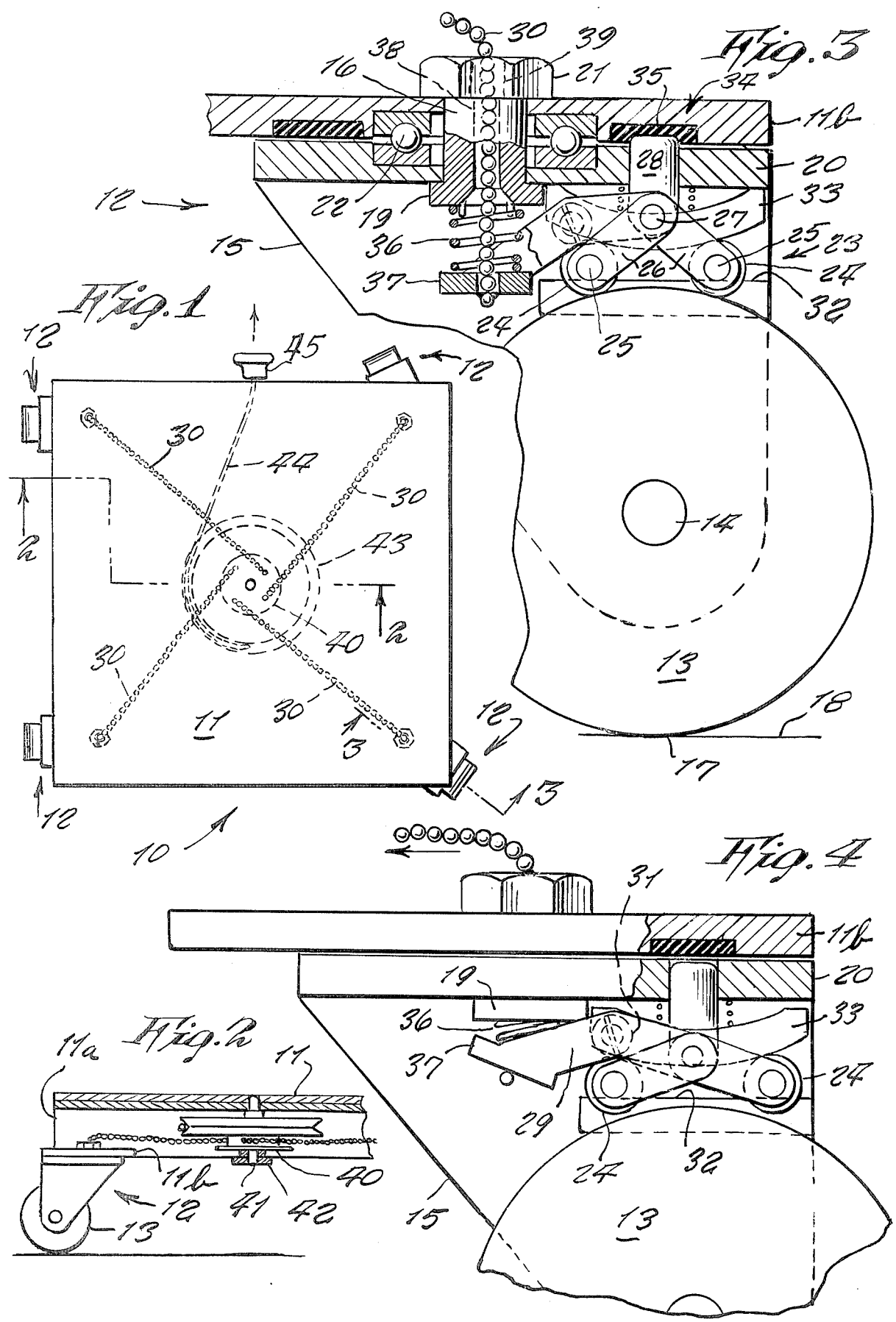

CASTER BRAKE AND SWIVEL LOCK

BACKGROUND OF THE INVENTION

This invention relates generally to dollies, and more specifically to dolly caster wheel assemblies.

The present invention is an improvement over applicant's U.S. Pat. No. 4,128,144, granted Dec. 5, 1978.

Heretofore various braking systems have been developed for holding a dolly caster wheels from travel on a floor or ground surface. However braking alone does not render a dolly fully stationary, in view of the fact that the caster wheels can still swivel, even though braked, so that this situation is accordingly in need of improvement in order to attain greater stability against any dolly movement.

SUMMARY OF THE INVENTION

Therefore it is a principal object of the present invention to provide an improved dolly in which each caster wheel can be locked from swivelling at a same time when it is braked.

Another object is to provide an improved dolly in which all the caster wheels can be simultaneously braked and swivel locked by simply releasing of a single knob, and wherein all can be simultaneously released and unlocked when the knob is pulled.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows:

FIG. 1 is a top view of a dolly incorporating the present invention.

FIG. 2 is a cross-sectional view on line 2—2 of FIG. 1.

FIG. 3 is an enlarged cross-sectional view on line 3—3 of FIG. 1, showing the dolly wheel locked.

FIG. 4 is a view similar to FIG. 3, showing the dolly wheel released.

DETAILED DESCRIPTION OF PREFERRED EMBODIMENT

Figure 5:
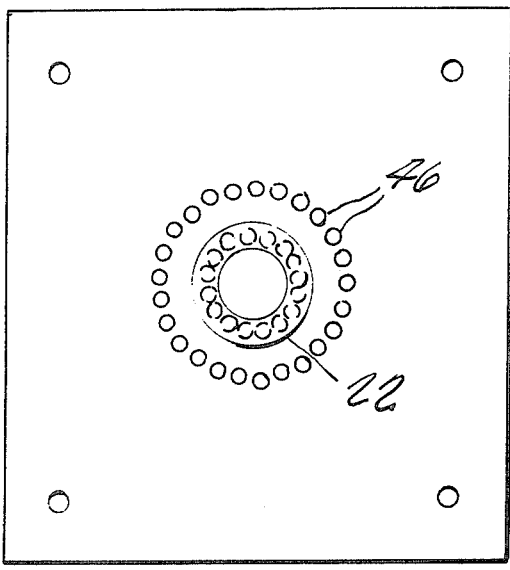
FIGS. 5, 6 and 7 shows various contact areas for jamb pin.

Referring now to the drawings in greater detail, the reference numeral 10 represents an improved dolly according to the present invention, which is comprised of a platform 11 mounted upon a frame 11a that includes frame plates 11b mounted upon caster wheel units 12, each of which incorporates a caster brake and swivel lock features.

Each caster wheel unit includes a caster wheel 13 rotatable about an axle 14 supported at its opposite ends in an inverted U-shaped bracket 15 which normally is free to swivel about a vertical king pin 16 extending downward from the frame 11a. In the present invention, a point of contact 17 of the wheel against the ground or floor surface 18 is located eccentrically respective to the vertical axis of the king pin, so that the bracket swivels automatically when a travel direction of the dolly is changed.

The king pin includes an enlarged head 19 bearing against the underside of the swivel bracket arch 20, the king pin extending upward therethrough and through the frame plate. A nut 21 is threaded on a top of the king pin. A thrust bearing 22 around the king pin, bears between the frame plate and the bracket arch.

A brake mechanism 23 of the invention includes a pair of rollers 24 rotatable on pins 25 supported between ends of two pairs of legs 26 which at their other end are pivotable about a pin 27 at one end of a post 28 and also at one end of a lever 29. The opposite end of the lever 29 is attached to a bead chain 30 which when pulled, carries the lever to rock about a stationary fulcrum or pivot screw 31 passed through an intermediate part of the lever. Thus when the chain pulls up one end of the lever, the other end of the lever is pushed downward. The opposite ends of the pins 25 rest upon stationary track rails 32, so that the downward travel of the lever past said other end causes the legs 26 to spread apart and the rollers 24 to move away from each other and out of wedged position between the rim of the caster wheel and an arcuate plate 33 so that the wheel is thus free to turn and travel, as shown in FIG. 4.

A swivel lock mechanism 34 of the invention includes a resilient rubber or plastic circular ring 35 embedded in an underside of the platform, the ring being positioned so that the upper end of the post 28 abuts thereagainst whenever the rollers 24 brake the wheel.

A strong compression coil spring 36 between an end 37 of the lever 29 and the king pin head normally hold the brake mechanism firmly against the caster wheel rim and the post abutted hard against the resilient ring. In order to release the brake and the swivel lock, the chain 30 accordingly must be pulled.

The chain 30 extends upward through a central hole 38 of the king pin and central hole 39 of the nut 21.

The chains 30 from all of the caster wheel units 12 of the dolly are attached around a single reel 40 positioned underneath the platform and mounted rotatably free on a vertical shaft 41 supported between the platform and a bar 42 attached to the frame 11a. The reel is made integral with a grooved pulley 43 around which a cable 44 is wound, one end of the cable being extended through a hole in the frame and fitted with a knob 45 for being pulled.

In operative use, a pull on the knob causes the bead chains to be pulled against the force of the compression coil springs 36, so to release the caster wheel brake and release the swivel lock.

In FIG. 5, the above-described resilient ring 35 is shown substituted by a circular row of counterbored holes 46 on the underside of the frame plate 11b. In operative use, the upper end of post 28 locks in any one of the holes, thus locking the swivel of the caster wheel.

Figure 6:
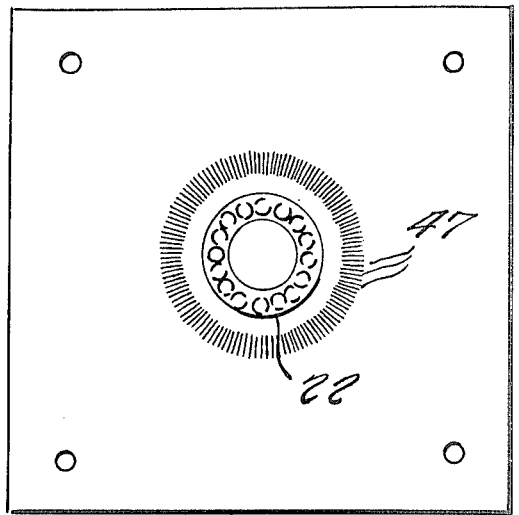
Figure 7:
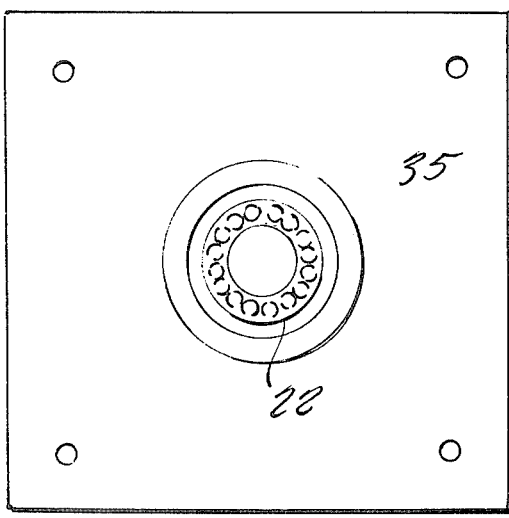

In FIG. 6, another design thereof a circular row of teeth 47 serve the same purpose so to frictionally hold the post. Alternately instead of teeth, the same may comprise a knurlled face, or the like.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention. I claim:

1. A dolly, comprising in combination, a platform mounted upon a frame, integral with a plurality of underside plates each of which is mounted upon a caster wheel assembly each of which includes a caster wheel rotatable about an axle supported in an inverted, U-shaped bracket, said bracket being pivotable about a vertical king pin supported in said plate, a thrust bearing between said plate and said bracket, a brake mechanism for said caster wheel and a swivel lock for said bracket; said brake mechanism comprising a pair of roller movable by lever means for being wedged between a rim of said wheel and a stationary component of said bracket; said swivel lock comprising a post carried by said bracket and being upwardly movable by said lever means so to jamb against a frictionally holding element upon an underside of said plate; said lever means comprising a lever pivotable on a stationary pin through an intermediate portion thereof, one end of said lever being connected to said brake mechanism while an opposite end of said lever is connected to a spring-loaded bead chain, said bead chains from each said caster wheel assembly extending through said king pins and being all connected to eccentric points around a single reel so to wind therearound, said reel being integral with a pulley having a cable wound therearound, and a knob on an end of said cable; said reel and pulley being supported rotatably on a shaft extending downward from an underside of said platform.

* * * * *